(12) United States Patent
Duffy et al.

(10) Patent No.: US 10,372,509 B2
(45) Date of Patent: Aug. 6, 2019

(54) COMPOSABLE AND CANCELABLE DATAFLOW CONTINUATION PASSING

(71) Applicant: Microsoft Technology Licensing, LLC, Redmond, WA (US)

(72) Inventors: John Duffy, Renton, WA (US); Stephen H. Toub, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/715,919

(22) Filed: Sep. 26, 2017

(65) Prior Publication Data

US 2018/0129543 A1 May 10, 2018

Related U.S. Application Data

(63) Continuation of application No. 12/131,812, filed on Jun. 2, 2008, now Pat. No. 9,772,887.

(51) Int. Cl.
G06F 9/44 (2018.01)
G06F 9/52 (2006.01)

(52) U.S. Cl.
CPC ...................... *G06F 9/52* (2013.01)

(58) Field of Classification Search
None
See application file for complete search history.

(56) References Cited

U.S. PATENT DOCUMENTS

| | | |
|---|---|---|
| 5,197,137 A | 3/1993 | Kumar et al. |
| 6,212,617 B1 | 4/2001 | Hardwick |
| 6,260,058 B1 * | 7/2001 | Hoenninger .......... G06F 9/4887 718/103 |
| 7,010,787 B2 | 3/2006 | Sakai |
| 7,065,634 B2 | 6/2006 | Lewis et al. |
| 7,069,555 B1 | 6/2006 | Tzen |
| 7,159,211 B2 | 1/2007 | Jalan et al. |
| 9,772,887 B2 | 9/2017 | Duffy et al. |
| 2002/0165902 A1 | 11/2002 | Robb et al. |
| 2006/0190236 A1 | 8/2006 | Malloy et al. |

(Continued)

FOREIGN PATENT DOCUMENTS

WO 2007113369 A1 10/2007

OTHER PUBLICATIONS

"Final Office Action Issued in U.S. Appl. No. 12/131,812", dated Oct. 24, 2012, 14 Pages.

(Continued)

*Primary Examiner* — Qamrun Nahar
(74) *Attorney, Agent, or Firm* — Dicke, Billig & Czaja, PLLC

(57) ABSTRACT

Parallel tasks are created, and the tasks include a first task and a second task. Each task resolves a future. At least one of three possible continuations for each of the tasks is supplied. The three continuations include a success continuation, a cancellation continuation, and a failure continuation. A value is returned as the future of the first task upon a success continuation for the first task. The value from the first task is used in the second task to compute a second future. The cancellation continuation is supplied if the task is cancelled and the failure continuation is supplied if the task does not return a value and the task is not cancelled.

20 Claims, 3 Drawing Sheets

(56) References Cited

U.S. PATENT DOCUMENTS

2006/0195732 A1 8/2006 Deutschle et al.
2009/0300591 A1 12/2009 Duffy et al.

OTHER PUBLICATIONS

"Final Office Action Issued in U.S. Appl. No. 12/131,812", dated Jan. 22, 2015, 14 Pages.
"Final Office Action Issued in U.S. Appl. No. 12/131,812", dated Jun. 17, 2016, 13 Pages.
"Non-Final Office Action Issued in U.S. Appl. No. 12/131,812", dated Nov. 18, 2016, 16 Pages.
"Non-Final Office Action Issued in U.S. Appl. No. 12/131,812", dated Apr. 12, 2012, 10 Pages.
"Non-Final Office Action Issued in U.S. Appl. No. 12/131,812", dated Jan. 12, 2016, 13 Pages.
"Non-Final Office Action Issued in U.S. Appl. No. 12/131,812", dated Jan. 14, 2014, 13 Pages.
"Non-Final Office Action Issued in U.S. Appl. No. 12/131,812", dated Aug. 5, 2014, 12 Pages.
"Notice of Allowance Issued in U.S. Appl. No. 12/131,812", dated May 24, 2017, 8 Pages.
Chang, et al., "Parallel Execution of Multiple Sequential Instruction Streams", In Proceedings of the Fifth IEEE Symposium on Parallel and Distributed Processing, Dec. 1, 1993, pp. 621-624.
Chudinov, et al., "Parallel Computing Runtime for Microsoft .NET Framework", In 1st International Workshop on C# and .NET Technologies on Algorithms, Computer Graphics, Visualization, Computer Vision and Distributed Computing, Feb. 6, 2003, 5 Pages.
Jafar, et al., "Fault-Tolerance for Macro Dataflow Parallel Computations on Grid", In Proceedings of International Conference on Information and Communication Technologies: From Theory to Applications, Apr. 19, 2004, 6 Pages.
Grimshaw, et al., "Portable Run-Time Support for Dynamic Object-Oriented Parallel Processing", In Journal of ACM Transactions on Computer Systems, vol. 14, Issue 2, May 1, 1996, pp. 139-170.
Halstead, et al., "Multilisp: A Language for Concurrent Symbolic Computation", In Journal of ACM Transactions on Programming Languages and Systems, vol. 7, Issue 4, Oct. 1, 1985, pp. 501-538.
Lipasti, et al., "Exceeding the Dataflow Limit via Value Prediction", In Proceedings of the 29th Annual ACM/IEEE International Symposium on Microarchitecture, Dec. 2, 1996, pp. 226-237.

\* cited by examiner

COMPOSABLE AND CANCELABLE DATAFLOW CONTINUATION PASSING

CROSS-REFERENCE TO RELATED APPLICATIONS

This patent application is a continuation of Ser. No. 12/131,812 filed Jun. 2, 2008, entitled "COMPOSABLE AND CANCELABLE DATAFLOW CONTINUATION PASSING," which is incorporated herein by reference.

BACKGROUND

Mainstream computer architectures in the future will rely on concurrency as a way to improve performance. This is in contrast to the past thirty years or so, which improved performance with increases in clock frequency and advances in superscalar execution techniques. In order for software to be successful in new architectures, programmers are transitioning to a different way of approaching software development and performance work. For example, simply reducing the number of cycles an algorithm requires to compute an answer does not necessarily translate into the fastest possible algorithm that scales well as new processors are adopted. This applies to client and server workloads alike. Multiple-core processors are already widely available, such as dual-core and quad-core processors from major manufacturers, and predictions of many more cores in the near future. Each core can also carry several hardware threads to mask memory latencies. This trend will continue into the foreseeable future, with the number of cores expected to double every two years or so.

Concurrent computing is the simultaneous execution of multiple interacting computational tasks in multiple processor environments such as multi-core processors. These tasks may be implemented as separate programs, or as a set of processes or threads created by a single software application. Concurrent programming is destined to create an entire new wave of software applications. For applications to run faster on the new hardware, developers will need to adopt concurrent programming. Moreover, there is a category of interesting applications and algorithms that only become feasible with the amount of compute power this transition will bring, ranging from rich immersive experiences complete with vision and speech integration to deeper semantic analysis, understanding, and mining of information.

In connection with concurrent programming, dataflow programming is a common concurrent, or parallel, programming idiom. Dataflow is a software architecture based on the idea that changing the value of a variable can automatically force recalculation of the values of other variables. For example, spreadsheets are perhaps the most widespread embodiment of dataflow. In a spreadsheet, a user can specify a cell formula that depends on other cells. When one or more of those cells are updated, the values in the other cells are automatically recalculated.

Dataflow programming in parallel architectures uses data dependence as the mechanism for synchronization of data. For example, code can wait for the completion of a computation in order to retrieve the resulting value. This is commonly represented in programming models with a "future" type. Managed programming environments, such as Microsoft .NET, can include a Future<T> type that is meant to represent a value to be computed in the future. An example can be:

Example 1

```
Future<T> f = ( ) => ComputeExpensiveT( );
    . . . do something in the meantime . . .
UseResult(f.Value);
```

In this usage, accessing a value of the future will cause a calling thread to resolve the future, wait for it while the future is computed if it hasn't yet finished its computation, or simply return the value if it is already available.

Waiting in parallel programming can lead to scaling inefficiencies and other problems. Blocking in programming can lead to inefficiencies due to the stack usage of a blocked thread, kernel transitions used to initiate and recover from blocking, and context switching. Data dependence is a viral property, however, so avoiding blocking becomes tediously difficult. For example, some software code may depend on one value and other software code may depend on that value too so the programs devolves into a tangled web of unstructured data dependencies. The dataflow programming model provides for expressiveness and power, but can lead to an undesirable arbitrarily complex sequence of data dependence that sacrifices programming performance or incurs unnecessary blocking. Handling failures in dataflow graphs poses a concern as this is a facet of preserving the expressive capability of existing sequential data dependence constructs, such as statements and try/catch blocks.

Additionally, a cancellation feature is often a property in many responsive systems. Graphical User Interface (GUI) threads often create asynchronous work and present the ability to the user to cancel that work. Dataflow computations are similar and are often more complicated. When chains of computations are strung together dynamically, the ability to cancel the work can be lost or become too cumbersome to represent in the programming model.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, parallel tasks are created, and the tasks include a first task and a second task. Each task resolves a future. At least one of three possible continuations for each of the tasks is supplied. The continuations can include a success continuation, a cancellation continuation, and a failure continuation. A value is returned as the future of the first task upon a success continuation for the first task. The value from the first task is used in the second task to compute a second future. The cancellation continuation is supplied if the task is cancelled, and the failure continuation is supplied if the task does not return a value and the task is not cancelled.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
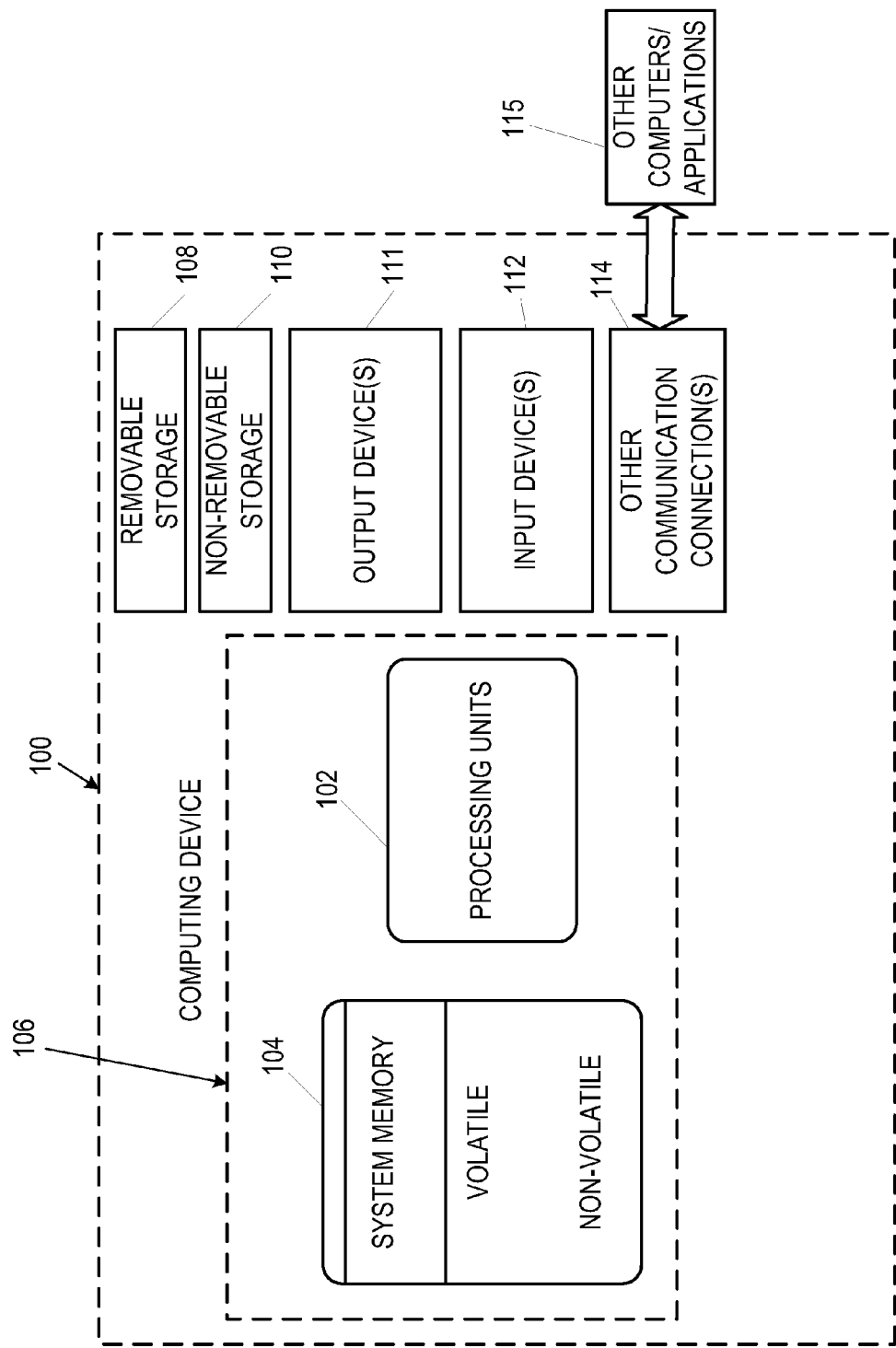
FIG. 1 is a block diagram illustrating an example computing system.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features/ functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

The computing device 100 can be configured to run an operating system software program and one or more software applications, which make up a system platform. In one example, the computing device 100 includes a software component referred to as a managed environment. The managed environment can be included as part of the operating system or can be included later as a software download. The managed environment typically includes precoded solutions to common programming problems to aid software developers to create software programs such as applications to run in the managed environment, and it also typically includes a virtual machine that allows the software applications to run in the managed environment so that the programmers need not consider the capabilities of the specific processors 102.

Figure 2:
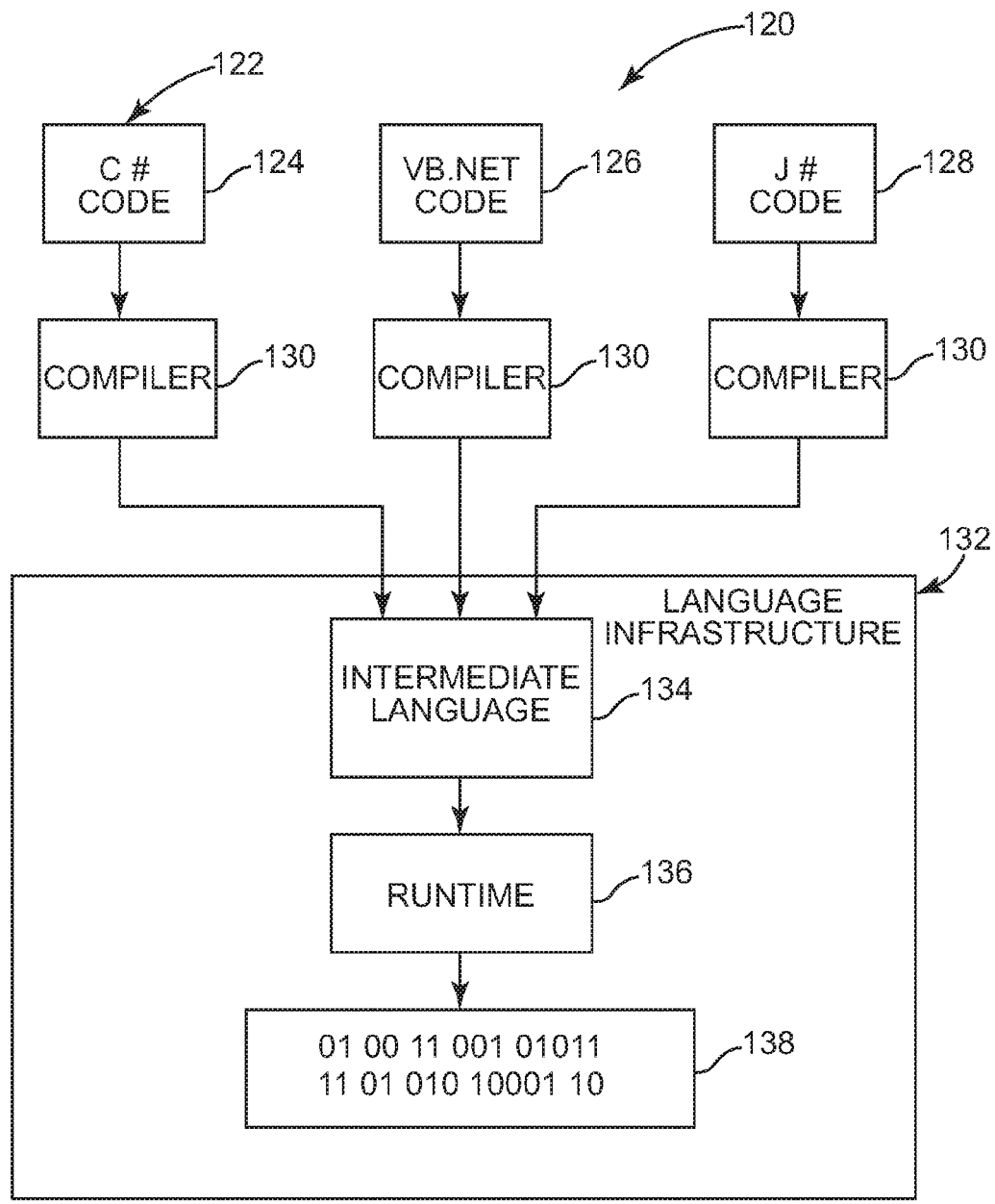
FIG. 2 is a block diagram illustrating one example of a managed environment operating on the computing system of FIG. 1.

FIG. 2 illustrates an example managed environment 120 suitable for operation with the computing device 100. Particular current examples of managed environments include Microsoft .NET framework, Java framework, or other commercial or user-specific varieties of managed environments. The managed environment 120 is configured to accept programs written in a high-level compatible code of one or more programming languages 122. For example, the managed environment can accept programs written in C type programming language such as C# code 124, a visual basic type language such as VB.NET code 126, and a Java type language such as J# 128. (C# and J# are pronounced C-sharp and J-sharp, respectively, even though it is followed by a pound sign rather than a sharp sign. In the case of C-sharp, it corresponds with the music note that is a step higher than C.) Compilers 130 are configured to compile each compatible code 124, 126, 128. The compiled code can be provided to an infrastructure 132 that describes an executable code and a runtime environment that describes a number of runtimes. An example of an infrastructure is Common Language Infrastructure (CLI). The infrastructure includes a second compiler 134 that receives the compatible languages and compiles them to a second and platform neutral intermediate language, such as Common Intermediate Language (CIL). The intermediate language is provided to another compiler 136 that compiles the intermediate language to a machine readable code 138 that can be executed on the current platform or computing device.

Figure 3:
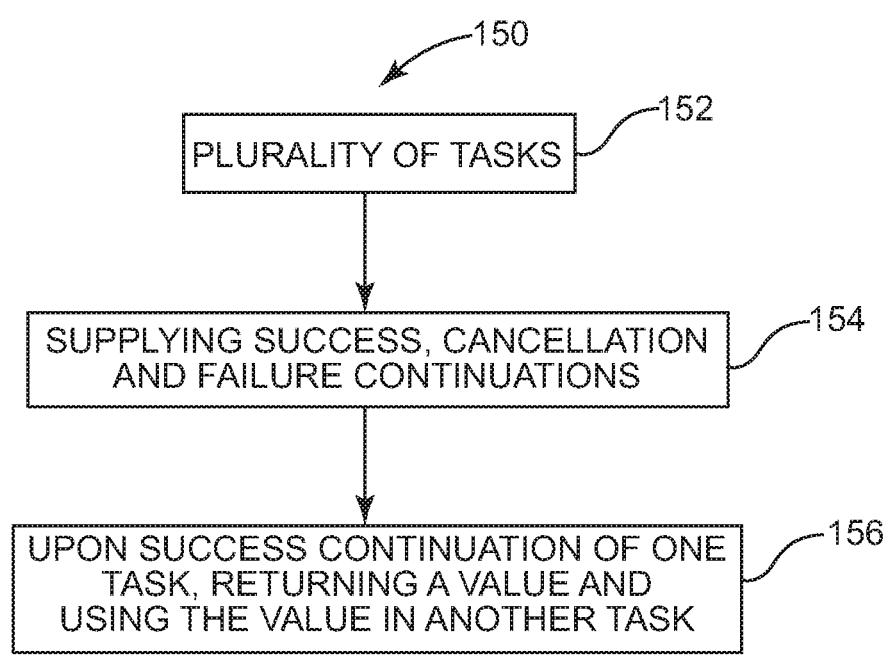
FIG. 3 is a flow chart illustrating a feature of the managed environment of FIG. 2.

FIG. 3 illustrates a method 150 for use with the managed environment 120. The method 150 can be included in a computer readable medium, such as a disc or stored in a memory either in or operably coupled to the computing device 100, which includes a plurality of instructions such as software code for the computing device to perform. In the example of FIG. 3, the method 150 includes a composable and cancelable dataflow continuation passing.

By way of introduction, individual units of parallel work are called tasks. A closure may occur when a function is defined within another function, and the inner function refers to local variables of the outer function. At runtime, when the outer function executes, a closure is formed, which includes the inner function's code and references to any variables of the outer function used by the closure. In the method 150, several tasks can be carried out in parallel to one another 152.

The tasks support continuations, which represents the rest of the computation given a point in the computation. For example one task may use a result of an initial task. Once this result is computed, the task uses the result to compute another result, and that other result can be used in still another task, and so on. Another word for "rest of the computation" is control state, meaning the data structures and code needed to complete a computation. Most languages implement the data structure as a variant of the stack and the code as just a pointer to the current instructions. The data appears to flow through the series of tasks, which is a feature of dataflow programming describe above. In other words, the tasks are chained together.

The development environment allows a task to supply three possible continuations, namely a success continuation, a failure continuation, and a cancellation continuation 154. The result of the task is passed on to the next task if a success continuation is supplied 156. The task is cancelled, as well as the remaining tasks of the dataflow, if the cancellation continuation is supplied. If neither the task produces a result nor the task was cancelled then a failure continuation is supplied. A task may support these continuations in a number ways.

In an example, a sequential application program interface "bool DoWork" can return true for success, throw an exception if it fails, and return false to indicate the operation was cancelled. Sequential C# type code to interact with "bool DoWork" can appear as follows:

Example 2

```
try {
    if (DoWork( ))
        DoSuccess( )
    else
        DoCancelled( );
} catch (Exception e) {
    DoFailure(e);
}
```

In the present approach, a continuation passing transformation can be applied to result in new object creation such as:

Example 3

```
Task t = new Task (( ) => DoWork( ), ( ) => DoSuccess( ), ( ) => DoCancelled( ), (e) => DoFailure(e));
```

In Example 4 below, multiple continuations are supported for the same kind.

Example 4

```
Task t = Task.Create(( ) => DoWork( ));
t.ContinueWith(( ) => A( ));
t.ContinueWith(( ) => B( ));
...
```

This allows for chaining, because we then can get back Task references, such as:

Example 5

```
Task t1 = Task.Create(( ) => DoWork( ));
Task t2 = t1.ContinueWith(( ) => A( ));
Task t3 = t2.ContinueWith(( ) => B( ));
```

Task t is waitable, but without blocking the continuations are self-contained and require no additional work to be done upon success, cancel, failure, and the like.

The method 150 also provides for a Future<T> type construct, discussed above, to include continuation support, because this construct is in essence a task. In this case, a success continuation accepts the T generated by the future itself as an argument:

Example 6

```
Future<T>f=new Future<T>( . . . ,(t)=>DoSuccess
    (t), . . . );
```

The continuations themselves can return a value. In Example 6, DoSuccess can return a value of interest based on a calculation of the future.

Example 7 below applies the chaining of Example 5 to Future<T> to have one value passed from one to the next:

Example 7

```
var c = Future.Create(( ) => A( )).
ContinueWith(a => B(a.Value)).
ContinueWith(b => C(b.Value));
```

The continuations are chained together in the dataflow paradigm asynchronously. Example 8 shows that once we have a Future<T>, we may wish to return some separate instance of U once the future has been resolved:

Example 8

```
Future<T> f = new Future<T> (delegate { MakeT( ); });
Future<U> u = f.ContinueWith<U> (delegate(T t) { MakeU(t); });
```

A delegate, such as the one used in Example 8, is a class that contains a function pointer. If that function pointer is to an instance method, the delegate may also contain a pointer/reference to the instance on which the function should be invoked. In these examples, the delegate keyword syntax here provides instructions to a compiler to take the code contained within the brackets and extract it into a separate method, where any variables between the parentheses become parameters to that method. For example:

```
delegate(T t) { MakeU(t); }
becomes
new Func<T>(AnonymousMethod1);
...
private static U AnonymousMethod1(T t)
```

```
    {
        return MakeU(t);
    }
```

Also in Example 8, the call to ContinueWith has constructed a new Future, of type U, that is bound to the call to MakeU at some point in the future after the call to MakeT has resolved and published the T value to the initial future object. This can be chained with other continuations indefinitely. Thus, the example 150 includes the feature of composability, i.e., where the futures are asynchronous and otherwise freely created into the chain without relying on other dependence. Also, two or more asynchronous tasks can depend directly from a future resolved from one task on a success continuation.

Example 9 shows Example 8 in a transformation of the dataflow-style sequential program into such constructs and now with failure continuations registered:

Example 9

```
try {
    T t = MakeT( );
    try {
        U u = MakeU(t);
    } catch (fooException fe) {
        DoFailureInner(fe);
    }
    . . .
} catch (Exception e) {
    DoFailure(e);
}
```

In order to represent the method 150 via continuations in one embodiment, the method 150 accommodates multiple exception clauses. As continuations are strung together, nesting begins to disappear. The method 150 can also include the ability to form composite exception clauses, which effectively become conjunctions in the syntax. In the nested example shown in Example 10 a new exception handler can be used to perform a DoFailureInner clause, and combine it with the outer DoFailure clause, such as in Example 10:

Example 10

```
Future<T> f = new Future<T> (delegate {make T( );}, (Exception e)
=>DoFailure(e));
Future<U> u = f.ContinueWith(delegate(T t) {MakeU(t); }), true,
(FooException fe) { DoFailureInner(fe); });
```

The "true" value of Example 10 specifies that existing exception clauses are to be preserved.

Once a combination of the expressions is strung together, we can cancel the entire string. Parent and Child relationships represent the entire dependent chain of work. The success continuation is automatically parented to the task or future that invoked it, and so on. Thus, cancellation of the top most function, such as f in the examples, propagates to the children, such as u in the examples. This is different for cancellation continuations because they can be called when the previous task is canceled. Consequently, causality is not lost.

continuations from groups of tasks/futures. Consider the following code snippet:

Example 11

```
Future<int> a = Future.Create(( ) => A( ));
Future<int> b = Future.Create(( ) => B( ));
Future<int> c = Future.Create(( ) => C( ));
Future<int> d =
    Future<int>.ContinueWhenAll(
        (x,y,z) =>
        DoSomethingWithAllValues(x.Value,y.Value,z.Value),
        a,b,c);
```

Accordingly, three futures for the methods A,B,C are created. A continuation is also created that is scheduled to use the results of all three of these futures. Unlike previous examples, the DoSomethingWithAllValues method is not registered to run when one future has completed; it is registered to run when a whole set of futures has completed. Similarly, continuations can be scheduled to run when any of a set of futures or tasks is completed. For example, three futures that all return integers could be created. To run a method with the result of any of those three futures when the first future or task completes, a Future.ContinueWhenAny could be created. Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof

What is claimed is:

1. A computer readable storage medium storing computer-executable instructions for controlling a computing device to:
    create plurality of parallel tasks including a first task and a second task in a data flow at runtime, wherein each task resolves a future;
    supply at least one of three possible continuations for each of the tasks including a success continuation, a cancellation continuation, and a failure continuation;
    return a value as the future of the first task upon a success continuation for the first task; and
    apply the value in the second task to compute a second future;
    wherein the cancellation continuation is supplied if the first task is cancelled and the failure continuation is supplied with an exception if the first does not return a value and the first task is not cancelled.

2. The computer readable storage medium of claim 1 wherein the tasks are provided as a future type.

3. The computer readable storage medium of claim 1, the computer-executable instructions for controlling the computing device to:
    return a second value as the second future upon a success continuation of the second task.

4. The computer readable storage medium of claim 3 wherein an additional task chained to the tasks such that the additional task uses the second value to compute an additional future and returns an additional value upon a success continuation of the additional task.

5. The computer readable storage medium of claim 1 wherein an additional task is chained to the first task such that the additional task uses the first value to compute an additional future and returns an additional value upon a success continuation of the additional task.

6. The computer readable storage medium of claim 1 wherein the tasks are self contained.

7. The computer readable storage medium of claim 1, wherein the continuations are supplied at a time the tasks are created.

8. The computer readable storage medium of claim 1, wherein the tasks are asynchronous.

9. The computer readable storage medium of claim 1, wherein the tasks are composable.

10. The computer readable storage medium of claim 1, wherein the tasks are not blocked.

11. The computer readable storage medium of claim 1, the computer-executable instructions for controlling the computing device to:
supply one of three possible continuations.

12. A method, comprising:
creating a plurality of parallel tasks including a first task and a second task in a data flow at runtime, wherein each task resolves a future;
supplying at least one of three possible continuations for each of the tasks including a success continuation, a cancellation continuation, and a failure continuation;
returning a value as the future of the first task upon a success continuation for the first task; and
applying the value in the second task to compute a second future;
wherein the cancellation continuation is supplied if the first task is cancelled and the failure continuation is supplied with an exception if the first task does not return a value and the first task is not cancelled.

13. The method of claim 12 comprising:
composing the tasks as data dependent asynchronous computations together in a parent-child chain having an parent task invoking a child task.

14. The method of claim 13 comprising:
passing one of the three continuations to a data-dependent dataflow computation in the chain including passing the returned value with the success continuation from the child task to the parent task and passing the cancellation continuation from the parent task to the child task.

15. The method of claim 14 wherein composing the data dependent asynchronous computations together in a chain comprises avoiding blocking of the computations.

16. A system, comprising:
memory to store a set of instructions; and
a processor to execute the set of instructions to:
create a plurality of parallel tasks including a first task and a second task in a data flow at runtime, wherein each task resolves a future;
supply at least one of three possible continuations for each of the tasks including a success continuation, a cancellation continuation, and a failure continuation;
return a value as the future of the first task upon a success continuation for the first task; and
apply the value in the second task to compute a second future;
wherein the cancellation continuation is supplied if the first task is cancelled and the failure continuation is supplied with an exception if the first task does not return a value and the first task is not cancelled.

17. The system of claim 16 wherein the set of instructions control a computerized managed environment.

18. The system of claim 17 wherein the managed environment supports a plurality of composable data-dependent dataflow computations.

19. The system of claim 16 wherein each continuation represents a control state given a point in the computation.

20. The system of claim 16 wherein each task resolves a future representing a value to be computed in the future and includes a control state to complete the computation.

* * * * *